United States Patent
Sharma et al.

(10) Patent No.: US 11,043,207 B2
(45) Date of Patent: Jun. 22, 2021

(54) SYSTEM AND METHOD FOR ARRAY DATA SIMULATION AND CUSTOMIZED ACOUSTIC MODELING FOR AMBIENT ASR

(71) Applicant: Nuance Communications, inc., Burlington, MA (US)

(72) Inventors: Dushyant Sharma, Woburn, MA (US); Sharmistha Sarkar Gray, Dracut, MA (US); Uwe Helmut Jost, Groton, MA (US); Patrick A. Naylor, Reading (GB)

(73) Assignee: Nuance Communications, Inc., Burlington, MA (US)

( * ) Notice: Subject to any disclaimer, the term of this patent is extended or adjusted under 35 U.S.C. 154(b) by 174 days.

(21) Appl. No.: 16/441,777

(22) Filed: Jun. 14, 2019

(65) Prior Publication Data
US 2020/0395003 A1 Dec. 17, 2020

(51) Int. Cl.
*G10L 15/06* (2013.01)
*G10L 15/20* (2006.01)
(Continued)

(52) U.S. Cl.
CPC .......... *G10L 15/063* (2013.01); *G10L 19/008* (2013.01); *H04S 7/30* (2013.01);
(Continued)

(58) Field of Classification Search
CPC .......... G10L 15/00; G10L 15/22; G10L 15/08; G10L 15/18; G10L 15/1822;
(Continued)

(56) References Cited

U.S. PATENT DOCUMENTS 5,805,747 A 9/1998 Bradford
5,809,476 A 9/1998 Ryan
(Continued)

FOREIGN PATENT DOCUMENTS

CN 101790752 A 7/2010
CN 106448722 A 2/2017
(Continued)

OTHER PUBLICATIONS

Lenert, L. A. et al., "Design and Evaluation of a Wireless Electronic Health Records System for Field Care in Mass Casualty Settings", Journal of the American Medical Informatics Association, <https://www.ncbi.nlm.nih.gov/pmc/articles/PMC3198000, vol. 18, No. 6, (2011), pp. 842-852.
(Continued)

*Primary Examiner* — Leshui Zhang
(74) *Attorney, Agent, or Firm* — Brian J. Colandreo; Michael T. Abramson; Holland & Knight LLP

(57) ABSTRACT

A method, computer program product, and computer system for measuring, by a computing device, a plurality of Room Impulse Responses (RIRs) associated with a set of two or more microphones. At least a portion of the RIRs may be augmented. At least the portion of the RIRs may be converted to their respective Relative Transfer Function (RTF) representations. The RTF representations may be applied to training data to generate an acoustic model for automatic speech recognition.

17 Claims, 3 Drawing Sheets

(51) Int. Cl.
*G10L 19/008* (2013.01)
*H04S 7/00* (2006.01)
*H04R 1/40* (2006.01)
*H04R 3/00* (2006.01)

(52) U.S. Cl.
CPC ... *G10L 2015/0631* (2013.01); *H04S 2400/01* (2013.01); *H04S 2420/01* (2013.01)

(58) Field of Classification Search
CPC ....... G10L 15/063; G10L 15/20; G10L 19/00; G10L 19/008; G06F 3/16; G06F 3/162; G06F 3/165; G06F 3/167; G06F 16/60; G06F 16/61; G06F 16/632; G06F 16/634; G06F 16/635; G06F 16/636; G06F 16/637; G06F 16/638; G06F 16/639; G06F 16/64; H04S 7/30; H04S 7/301; H04S 7/302; H04S 7/303; H04S 7/305; H04S 7/307; H04S 7/00; H04S 2400/01; H04S 2015/0631; H04S 2015/0633; H04S 2420/00; H04S 2420/01; H04R 1/245; H04R 1/265; H04R 9/16; H04R 11/12; H04R 17/08; H04R 19/10; H04R 2430/00; H04R 2430/20; H04R 1/406; H04R 3/005; G10K 2210/3055; G10K 2210/3048; G10K 2210/30232; G10K 2210/12
USPC ...... 704/231, 233, 244, 278; 381/56, 57, 61, 381/66, 26, 92, 74; 700/94
See application file for complete search history.

(56) References Cited

U.S. PATENT DOCUMENTS

| | | | |
|---|---|---|---|
| 5,940,118 A | 8/1999 | Van Schyndel | |
| 5,970,455 A | 10/1999 | Wilcox | |
| 5,970,457 A | 10/1999 | Brant et al. | |
| 6,031,526 A | 2/2000 | Shipp | |
| 6,266,635 B1 | 7/2001 | Sneh | |
| 6,332,122 B1 | 12/2001 | Ortega et al. | |
| 6,401,063 B1 | 6/2002 | Hebert et al. | |
| 6,405,165 B1 | 6/2002 | Blum et al. | |
| 6,434,520 B1 | 8/2002 | Kanevsky et al. | |
| 6,523,166 B1 | 2/2003 | Mishra et al. | |
| 6,589,169 B1 | 7/2003 | Surwit et al. | |
| 6,801,916 B2 | 10/2004 | Roberge et al. | |
| 6,823,203 B2 | 11/2004 | Jordan | |
| 6,847,336 B1 | 1/2005 | Lemelson et al. | |
| 6,915,254 B1 | 7/2005 | Heinze et al. | |
| 7,236,618 B1 | 6/2007 | Chui et al. | |
| 7,412,396 B1 | 8/2008 | Haq | |
| 7,493,253 B1 | 2/2009 | Ceusters et al. | |
| 7,496,500 B2 | 2/2009 | Reed et al. | |
| 7,516,070 B2 | 4/2009 | Kahn | |
| 7,558,156 B2 | 7/2009 | Vook et al. | |
| 7,817,805 B1 | 10/2010 | Griffin | |
| 7,830,962 B1 | 11/2010 | Fernandez | |
| 8,214,082 B2 | 7/2012 | Tsai et al. | |
| 8,345,887 B1* | 1/2013 | Betbeder | G10H 1/0091 381/63 |
| 8,589,177 B2 | 11/2013 | Haq | |
| 8,589,372 B2 | 11/2013 | Krislov | |
| 8,606,594 B2 | 12/2013 | Stern et al. | |
| 8,661,012 B1 | 2/2014 | Baker et al. | |
| 8,843,372 B1 | 9/2014 | Isenberg | |
| 8,983,889 B1 | 3/2015 | Stoneman | |
| 9,146,301 B2 | 9/2015 | Adcock et al. | |
| 9,224,180 B2 | 12/2015 | Macoviak et al. | |
| 9,270,964 B1 | 2/2016 | Tseytlin | |
| 9,293,151 B2 | 3/2016 | Herbig et al. | |
| 9,338,493 B2 | 5/2016 | Van Os et al. | |
| 9,536,049 B2 | 1/2017 | Brown et al. | |
| 9,536,106 B2 | 1/2017 | Fram | |
| 9,569,593 B2 | 2/2017 | Casella dos Santos | |
| 9,569,594 B2 | 2/2017 | Casella dos Santos | |
| 9,668,024 B2 | 5/2017 | Os et al. | |
| 9,668,066 B1 | 5/2017 | Betts et al. | |
| 9,779,631 B1 | 10/2017 | Miller et al. | |
| 9,785,753 B2 | 10/2017 | Casella dos Santos | |
| 9,799,206 B1 | 10/2017 | Wilson Van Horn | |
| 9,824,691 B1 | 11/2017 | Montero et al. | |
| RE47,049 E | 9/2018 | Zhu | |
| 10,090,068 B2 | 10/2018 | Kusens et al. | |
| 10,219,083 B2 | 2/2019 | Farmani et al. | |
| 10,423,948 B1 | 9/2019 | Wilson et al. | |
| 10,440,498 B1* | 10/2019 | Amengual Gari | H04S 7/305 |
| 10,491,598 B2 | 11/2019 | Leblang et al. | |
| 10,559,295 B1* | 2/2020 | Abel | G10K 15/12 |
| 10,693,872 B1 | 6/2020 | Larson et al. | |
| 10,785,565 B2 | 9/2020 | Mate et al. | |
| 10,810,574 B1 | 10/2020 | Wilson et al. | |
| 2001/0029322 A1 | 10/2001 | Iliff | |
| 2001/0041992 A1 | 11/2001 | Lewis et al. | |
| 2001/0042114 A1 | 11/2001 | Agraharam et al. | |
| 2002/0032583 A1 | 3/2002 | Joao | |
| 2002/0069056 A1 | 6/2002 | Nofsinger | |
| 2002/0072896 A1 | 6/2002 | Roberge et al. | |
| 2002/0082825 A1 | 6/2002 | Rowlandson et al. | |
| 2002/0143533 A1 | 10/2002 | Lucas et al. | |
| 2002/0170565 A1 | 11/2002 | Walker et al. | |
| 2002/0178002 A1 | 11/2002 | Boguraev et al. | |
| 2002/0194005 A1 | 12/2002 | Lahr | |
| 2003/0028401 A1 | 2/2003 | Kaufman et al. | |
| 2003/0105638 A1 | 6/2003 | Taira | |
| 2003/0125940 A1 | 7/2003 | Basson et al. | |
| 2003/0154085 A1 | 8/2003 | Kelley | |
| 2003/0185411 A1 | 10/2003 | Atlas et al. | |
| 2003/0216937 A1 | 11/2003 | Schreiber et al. | |
| 2004/0078228 A1 | 4/2004 | Fitzgerald et al. | |
| 2004/0122701 A1 | 6/2004 | Dahlin et al. | |
| 2004/0128323 A1 | 7/2004 | Walker | |
| 2004/0162728 A1 | 8/2004 | Thomson et al. | |
| 2004/0167644 A1 | 8/2004 | Swinney | |
| 2004/0186712 A1 | 9/2004 | Coles et al. | |
| 2004/0243545 A1 | 12/2004 | Boone et al. | |
| 2005/0055215 A1 | 3/2005 | Klotz | |
| 2005/0165285 A1 | 7/2005 | Liff | |
| 2005/0192848 A1 | 9/2005 | Kozminski et al. | |
| 2006/0041427 A1 | 2/2006 | Yegnanarayanan et al. | |
| 2006/0041428 A1 | 2/2006 | Fritsch et al. | |
| 2006/0092978 A1 | 5/2006 | John et al. | |
| 2006/0104458 A1 | 5/2006 | Kenoyer et al. | |
| 2006/0142739 A1 | 6/2006 | DiSilestro et al. | |
| 2006/0173753 A1 | 8/2006 | Padmanabhan et al. | |
| 2006/0241943 A1 | 10/2006 | Benja-Athon et al. | |
| 2006/0277071 A1 | 12/2006 | Shufeldt | |
| 2007/0033032 A1 | 2/2007 | Schubert et al. | |
| 2007/0071206 A1 | 3/2007 | Gainsboro et al. | |
| 2007/0136218 A1 | 6/2007 | Bauer et al. | |
| 2007/0167709 A1 | 7/2007 | Slayton et al. | |
| 2007/0169021 A1 | 7/2007 | Huynh et al. | |
| 2007/0208567 A1 | 9/2007 | Amento et al. | |
| 2007/0233488 A1 | 10/2007 | Carus et al. | |
| 2007/0260977 A1 | 11/2007 | Allard et al. | |
| 2008/0004505 A1 | 1/2008 | Kapit et al. | |
| 2008/0004904 A1 | 1/2008 | Tran | |
| 2008/0040162 A1 | 2/2008 | Brice | |
| 2008/0059182 A1 | 3/2008 | Benja-Athon et al. | |
| 2008/0062280 A1 | 3/2008 | Wang et al. | |
| 2008/0071575 A1 | 3/2008 | Climax et al. | |
| 2008/0177537 A1 | 7/2008 | Ash et al. | |
| 2008/0240463 A1 | 10/2008 | Florencio et al. | |
| 2008/0247274 A1 | 10/2008 | Seltzer et al. | |
| 2008/0263451 A1 | 10/2008 | Portele et al. | |
| 2009/0024416 A1 | 1/2009 | McLaughlin et al. | |
| 2009/0070103 A1 | 3/2009 | Beggelman et al. | |
| 2009/0089100 A1 | 4/2009 | Nenov et al. | |
| 2009/0172773 A1 | 7/2009 | Moore | |
| 2009/0177477 A1 | 7/2009 | Nenov | |
| 2009/0177492 A1 | 7/2009 | Hasan et al. | |
| 2009/0187407 A1 | 7/2009 | Soble et al. | |

(56) References Cited

U.S. PATENT DOCUMENTS

| | | |
|---|---|---|
| 2009/0198520 A1 | 8/2009 | Piovanetti-Perez |
| 2009/0213123 A1 | 8/2009 | Crow |
| 2009/0270690 A1 | 10/2009 | Roos et al. |
| 2010/0036676 A1 | 2/2010 | Safdi et al. |
| 2010/0039296 A1 | 2/2010 | Marggraff et al. |
| 2010/0076760 A1 | 3/2010 | Kraenzel et al. |
| 2010/0077289 A1 | 3/2010 | Das et al. |
| 2010/0082657 A1 | 4/2010 | Paparizos et al. |
| 2010/0088095 A1 | 4/2010 | John |
| 2010/0094656 A1 | 4/2010 | Conant |
| 2010/0094657 A1 | 4/2010 | Stern et al. |
| 2010/0100376 A1 | 4/2010 | Harrington |
| 2010/0131532 A1 | 5/2010 | Schultz |
| 2010/0145736 A1 | 6/2010 | Rohwer |
| 2010/0223216 A1 | 9/2010 | Eggert et al. |
| 2010/0238323 A1 | 9/2010 | Englund |
| 2010/0241662 A1 | 9/2010 | Keith, Jr. |
| 2011/0015943 A1 | 1/2011 | Keldie et al. |
| 2011/0035221 A1 | 2/2011 | Zhang et al. |
| 2011/0063405 A1 | 3/2011 | Yam |
| 2011/0063429 A1 | 3/2011 | Contolini et al. |
| 2011/0066425 A1 | 3/2011 | Hudgins et al. |
| 2011/0071675 A1 | 3/2011 | Wells et al. |
| 2011/0096941 A1 | 4/2011 | Marzetta et al. |
| 2011/0145013 A1 | 6/2011 | McLaughlin |
| 2011/0150420 A1 | 6/2011 | Cordonnier |
| 2011/0153520 A1 | 6/2011 | Coifman |
| 2011/0178798 A1 | 7/2011 | Flaks et al. |
| 2011/0178813 A1 | 7/2011 | Moore |
| 2011/0202370 A1 | 8/2011 | Green, III et al. |
| 2011/0251852 A1 | 10/2011 | Blas |
| 2011/0286584 A1 | 11/2011 | Angel et al. |
| 2011/0301982 A1 | 12/2011 | Green, Jr. et al. |
| 2012/0020485 A1 | 1/2012 | Visser et al. |
| 2012/0029918 A1 | 2/2012 | Bachtiger |
| 2012/0053936 A1 | 3/2012 | Marvit |
| 2012/0076316 A1 | 3/2012 | Zhu et al. |
| 2012/0078626 A1 | 3/2012 | Tsai et al. |
| 2012/0101847 A1 | 4/2012 | Johnson et al. |
| 2012/0134507 A1 | 5/2012 | Dimitriadis et al. |
| 2012/0158432 A1 | 6/2012 | Jain et al. |
| 2012/0173281 A1 | 7/2012 | DiLella et al. |
| 2012/0197660 A1 | 8/2012 | Prodanovich |
| 2012/0208166 A1 | 8/2012 | Ernst et al. |
| 2012/0212337 A1 | 8/2012 | Montyne et al. |
| 2012/0215551 A1 | 8/2012 | Flanagan et al. |
| 2012/0215557 A1 | 8/2012 | Flanagan et al. |
| 2012/0215559 A1 | 8/2012 | Flanagan et al. |
| 2012/0239430 A1 | 9/2012 | Corfield |
| 2012/0253801 A1 | 10/2012 | Santos Lang et al. |
| 2012/0253811 A1 | 10/2012 | Breslin et al. |
| 2012/0254917 A1 | 10/2012 | Burkitt et al. |
| 2012/0323574 A1 | 12/2012 | Wang et al. |
| 2012/0323575 A1 | 12/2012 | Gibbon et al. |
| 2013/0017834 A1 | 1/2013 | Han et al. |
| 2013/0035961 A1 | 2/2013 | Yegnanarayanan |
| 2013/0041682 A1 | 2/2013 | Gottlieb et al. |
| 2013/0041685 A1 | 2/2013 | Yegnanarayanan |
| 2013/0064358 A1 | 3/2013 | Nusbaum |
| 2013/0073306 A1 | 3/2013 | Shlain et al. |
| 2013/0103400 A1 | 4/2013 | Yegnanarayanan et al. |
| 2013/0138457 A1 | 5/2013 | Ragusa |
| 2013/0173287 A1 | 7/2013 | Cashman et al. |
| 2013/0188923 A1 | 7/2013 | Hartley et al. |
| 2013/0238312 A1 | 9/2013 | Waibel |
| 2013/0238329 A1 | 9/2013 | Casella dos Santos |
| 2013/0238330 A1 | 9/2013 | Casella dos Santos |
| 2013/0246098 A1 | 9/2013 | Habboush et al. |
| 2013/0246329 A1 | 9/2013 | Pasquero et al. |
| 2013/0297347 A1 | 11/2013 | Cardoza et al. |
| 2013/0297348 A1 | 11/2013 | Cardoza et al. |
| 2013/0301837 A1 | 11/2013 | Kim et al. |
| 2013/0332004 A1 | 12/2013 | Gompert et al. |
| 2013/0339030 A1 | 12/2013 | Ehsani et al. |
| 2014/0019128 A1 | 1/2014 | Riskin et al. |
| 2014/0035920 A1 | 2/2014 | Duwenhorst |
| 2014/0050307 A1 | 2/2014 | Yuzefovich |
| 2014/0073880 A1 | 3/2014 | Boucher |
| 2014/0074454 A1 | 3/2014 | Brown et al. |
| 2014/0093135 A1 | 4/2014 | Reid et al. |
| 2014/0142944 A1 | 5/2014 | Ziv et al. |
| 2014/0164994 A1 | 6/2014 | Myslinski |
| 2014/0169767 A1 | 6/2014 | Goldberg |
| 2014/0188475 A1 | 7/2014 | Lev-Tov et al. |
| 2014/0207491 A1 | 7/2014 | Zimmerman et al. |
| 2014/0223467 A1 | 8/2014 | Hayton et al. |
| 2014/0249818 A1 | 9/2014 | Yegnanarayanan et al. |
| 2014/0249830 A1 | 9/2014 | Gallopyn et al. |
| 2014/0249831 A1 | 9/2014 | Gallopyn et al. |
| 2014/0249847 A1 | 9/2014 | Soon-Shiong et al. |
| 2014/0278522 A1 | 9/2014 | Ramsey et al. |
| 2014/0288968 A1 | 9/2014 | Johnson |
| 2014/0324477 A1 | 10/2014 | Oez |
| 2014/0330586 A1 | 11/2014 | Riskin et al. |
| 2014/0337016 A1 | 11/2014 | Herbig et al. |
| 2014/0337048 A1 | 11/2014 | Brown et al. |
| 2014/0343939 A1 | 11/2014 | Mathias et al. |
| 2014/0362253 A1 | 12/2014 | Kim et al. |
| 2014/0365241 A1 | 12/2014 | Dillie et al. |
| 2014/0365242 A1 | 12/2014 | Neff |
| 2015/0046189 A1 | 2/2015 | Dao |
| 2015/0052541 A1 | 2/2015 | Cheng |
| 2015/0070507 A1 | 3/2015 | Kagan |
| 2015/0086038 A1 | 3/2015 | Stein et al. |
| 2015/0088514 A1 | 3/2015 | Typrin |
| 2015/0088546 A1 | 3/2015 | Balram et al. |
| 2015/0120305 A1 | 4/2015 | Buck et al. |
| 2015/0120321 A1 | 4/2015 | David et al. |
| 2015/0124277 A1 | 5/2015 | Ono et al. |
| 2015/0124975 A1 | 5/2015 | Pontoppidan |
| 2015/0172262 A1 | 6/2015 | Ortiz, Jr. et al. |
| 2015/0172319 A1 | 6/2015 | Rodniansky |
| 2015/0185312 A1 | 7/2015 | Gaubitch et al. |
| 2015/0187209 A1 | 7/2015 | Brandt |
| 2015/0278449 A1 | 10/2015 | Laborde |
| 2015/0278534 A1 | 10/2015 | Thiyagarajan et al. |
| 2015/0290802 A1 | 10/2015 | Buehler et al. |
| 2015/0294079 A1 | 10/2015 | Bergougnan |
| 2015/0302156 A1 | 10/2015 | Parsadoust |
| 2015/0310174 A1 | 10/2015 | Coudert et al. |
| 2015/0310362 A1 | 10/2015 | Huffman |
| 2015/0379200 A1 | 12/2015 | Gifford et al. |
| 2015/0379209 A1 | 12/2015 | Kusuma et al. |
| 2016/0012198 A1 | 1/2016 | Gainer, III et al. |
| 2016/0034643 A1 | 2/2016 | Zasowski et al. |
| 2016/0063206 A1 | 3/2016 | Wilson |
| 2016/0064000 A1 | 3/2016 | Mizumoto et al. |
| 2016/0098521 A1 | 4/2016 | Koziol |
| 2016/0119338 A1 | 4/2016 | Cheyer |
| 2016/0148077 A1 | 5/2016 | Cox et al. |
| 2016/0163331 A1 | 6/2016 | Yamaguchi |
| 2016/0165350 A1 | 6/2016 | Benattar |
| 2016/0176375 A1 | 6/2016 | Bolton et al. |
| 2016/0179770 A1 | 6/2016 | Koll et al. |
| 2016/0188809 A1 | 6/2016 | Legorburn |
| 2016/0191357 A1 | 6/2016 | Orner et al. |
| 2016/0196821 A1 | 7/2016 | Yegnanarayanan et al. |
| 2016/0203327 A1 | 7/2016 | Akkiraju et al. |
| 2016/0217807 A1 | 7/2016 | Gainsboro et al. |
| 2016/0261930 A1 | 9/2016 | Kim |
| 2016/0275187 A1 | 9/2016 | Chowdhury et al. |
| 2016/0300020 A1 | 10/2016 | Wetta et al. |
| 2016/0342845 A1 | 11/2016 | Tien-Spalding et al. |
| 2016/0350950 A1 | 12/2016 | Ritchie et al. |
| 2016/0357538 A1 | 12/2016 | Lewallen et al. |
| 2016/0358632 A1 | 12/2016 | Lakhani et al. |
| 2016/0360336 A1 | 12/2016 | Gross et al. |
| 2016/0364606 A1 | 12/2016 | Conway et al. |
| 2017/0004260 A1 | 1/2017 | Moturu et al. |
| 2017/0011194 A1 | 1/2017 | Arshad et al. |
| 2017/0011740 A1 | 1/2017 | Gauci |
| 2017/0017834 A1 | 1/2017 | Sabitov et al. |
| 2017/0019744 A1 | 1/2017 | Matsumoto et al. |
| 2017/0046326 A1 | 2/2017 | Waibel |

(56) References Cited

U.S. PATENT DOCUMENTS

| | | |
|---|---|---|
| 2017/0069226 A1 | 3/2017 | Spinelli et al. |
| 2017/0076619 A1 | 3/2017 | Wallach et al. |
| 2017/0083214 A1 | 3/2017 | Furesjo et al. |
| 2017/0091246 A1 | 3/2017 | Risvik et al. |
| 2017/0116384 A1 | 4/2017 | Ghani |
| 2017/0116392 A1 | 4/2017 | Casella dos Santos |
| 2017/0131384 A1 | 5/2017 | Davis et al. |
| 2017/0178664 A1 | 6/2017 | Wingate et al. |
| 2017/0228500 A1 | 8/2017 | Massengale |
| 2017/0242840 A1 | 8/2017 | Lu et al. |
| 2017/0316775 A1 | 11/2017 | Le et al. |
| 2017/0334069 A1 | 11/2017 | Wang et al. |
| 2018/0004915 A1 | 1/2018 | Talbot et al. |
| 2018/0025093 A1 | 1/2018 | Xia et al. |
| 2018/0032702 A1 | 2/2018 | Casella dos Santos |
| 2018/0081859 A1 | 3/2018 | Snider et al. |
| 2018/0107815 A1 | 4/2018 | Wu et al. |
| 2018/0130554 A1 | 5/2018 | Cheng |
| 2018/0144120 A1 | 5/2018 | Fram |
| 2018/0144747 A1 | 5/2018 | Skarbovsky et al. |
| 2018/0156887 A1 | 6/2018 | Qui et al. |
| 2018/0158461 A1 | 6/2018 | Wolff et al. |
| 2018/0167243 A1 | 6/2018 | Gerdes |
| 2018/0181716 A1 | 6/2018 | Mander et al. |
| 2018/0197544 A1 | 7/2018 | Brooksby et al. |
| 2018/0197548 A1 | 7/2018 | Palakodety et al. |
| 2018/0240538 A1 | 8/2018 | Koll et al. |
| 2018/0261307 A1 | 9/2018 | Couse et al. |
| 2018/0310114 A1 | 10/2018 | Eronen et al. |
| 2018/0314689 A1 | 11/2018 | Wang et al. |
| 2018/0315428 A1 | 11/2018 | Johnson et al. |
| 2019/0005959 A1 | 1/2019 | Cameron et al. |
| 2019/0012449 A1 | 1/2019 | Cheyer |
| 2019/0042606 A1 | 2/2019 | Griffith et al. |
| 2019/0051395 A1 | 2/2019 | Owen et al. |
| 2019/0096534 A1 | 3/2019 | Joao |
| 2019/0121532 A1 | 4/2019 | Strader et al. |
| 2019/0122766 A1 | 4/2019 | Strader et al. |
| 2019/0130073 A1 | 5/2019 | Sun et al. |
| 2019/0141031 A1 | 5/2019 | Devdas et al. |
| 2019/0182124 A1 | 6/2019 | Jeuk et al. |
| 2019/0214121 A1 | 7/2019 | O'Keeffe et al. |
| 2019/0251156 A1 | 8/2019 | Waibel |
| 2019/0265345 A1 | 8/2019 | Jungmaier et al. |
| 2019/0272844 A1 | 9/2019 | Sharma et al. |
| 2019/0313903 A1 | 10/2019 | McKinnon |
| 2020/0005939 A1 | 1/2020 | Stevens et al. |
| 2020/0034753 A1 | 1/2020 | Hammad |
| 2020/0279107 A1 | 9/2020 | Staar et al. |

FOREIGN PATENT DOCUMENTS

| | | |
|---|---|---|
| EP | 1769771 A1 | 4/2007 |
| EP | 1927221 B1 | 11/2013 |
| JP | 2015533248 A | 11/2015 |
| WO | 0008585 A2 | 2/2000 |
| WO | 2013082087 A1 | 6/2013 |
| WO | 2014101472 A1 | 3/2014 |
| WO | 2017031972 A1 | 3/2017 |
| WO | 2017138934 A2 | 8/2017 |

OTHER PUBLICATIONS

International Search Report issued in related PCT Application Serial No. PCT/US2019/020742 dated May 14, 2019.
International Search Report issued in related PCT Application Serial No. PCT/US209/020739 dated May 17, 2019.
International Search Report issued in related PCT Application Serial No. PCT/US2019/020763 dated May 23, 2019.
International Search Report issued in related PCT Application Serial No. PCT/US2019/020765 dated May 23, 2019.
International Search Report issued in related PCT Application Serial No. PCT/US2019/020778 dated May 23, 2019.
International Search Report issued in related PCT Application Serial No. PCT/US2019/020771 dated May 30, 2019.
Non-Final Office Action issued in related U.S. Appl. No. 16/059,818 dated Jun. 10, 2019.
International Search Report issued in related PCT Application Serial No. PCT/US2019/020721 dated Jun. 6, 2019.
International Search Report issued in related PCT Application Serial No. PCT/US2019/020755 dated Jun. 6, 2019.
Final Office Action issued in related U.S. Appl. No. 16/059,967 dated Jul. 11, 2019.
Final Office Action issued in related U.S. Appl. No. 16/100,030 dated Jul. 18, 2019.
Non-Final Office Action issued in related U.S. Appl. No. 16/058,951 dated Jul. 25, 2019.
International Search Report issued in related International App. No. PCT/US2019/020788 dated Jul. 17, 2019.
Final Office Action issued in related U.S. Appl. No. 16/058,912 dated Jul. 31, 2019.
Final Office Action issued in related U.S. Appl. No. 16/059,944 dated Aug. 22, 2019.
Non-Final Office Action issued in related U.S. Appl. No. 16/058,871 dated Sep. 23, 2019.
Final Office Action issued in related U.S. Appl. No. 16/059,818 dated Sep. 25, 2019.
Notice of Allowance issued in related U.S. Appl. No. 16/100,030 dated Oct. 9, 2019.
Non-Final Office Action issued in related U.S. Appl. No. 16/192,427 dated Oct. 3, 2019.
Non-Final Office Action issued in related U.S. Appl. No. 16/271,616 dated Nov. 15, 2019.
Non-Final Office Action issued in related U.S. Appl. No. 16/192,358 dated Nov. 19, 2019.
Non-Final Office Action issued in related U.S. Appl. No. 16/059,944 dated Dec. 23, 2019.
Non-Final Office Action issued in related U.S. Appl. No. 16/059,818 dated Jan. 9, 2020.
Non-Final Office Action issued in related U.S. Appl. No. 16/058,912 dated Jan. 27, 2020.
Non-Final Office Action issued in related U.S. Appl. No. 16/292,920 dated Feb. 28, 2020.
Non-Final Office Action issued in related U.S. Appl. No. 16/100,030, dated Mar. 4, 2020.
Notice of Allowance issued in related U.S. Appl. No. 16/271,616, dated Mar. 17, 2019.
Dibiase, J. H. et al., "Robust Localization in Reverberant Rooms," in Microphone Arrays—Signal Processing Techniques and Applications, Ch. 8, pp. 157-180.
Valin, Jean-Marc et al., "Robust Sound Source Localization Using a Microphone Array on a Mobile Robot," Proceedings of the 2003 IEEE/RSJ International Conference on Intelligent Robots and Systems, vol. 2, 2003, pp. 1228-1233.
Wang, L. et al., "Over-determined Source Separation and Localization Using Distributed Microphone," IEEE/ACM Transactions on Audio, Speech, and Language Processing, vol. 24, No. 9, Sep. 2016, pp. 1573-1588.
Notice of Allowance issued in related U.S. Appl. No. 16/108,959, dated Nov. 6, 2019.
Bahdanau, D. et al., "Neural Machine Translation by Jointly Learning to Align and Translate", Published as a Conference Paper at ICLR 2015, May 19, 2016, 15 pages.
Final Office Action issued in related U.S. Appl. No. 16/192,427, dated Mar. 6, 2020.
Final Office Action issued in related U.S. Appl. No. 16/058,871, dated Mar. 19, 2020.
Final Office Action issued in related U.S. Appl. No. 16/059,944, dated Mar. 26, 2020.
Non-Final Office Action issued in related U.S. Appl. No. 16/058,936, dated Apr. 15, 2020.
Non-Final Office Action issued in related U.S. Appl. No. 16/058,941, dated Apr. 15, 2020.
Non-Final Office Action issued in related U.S. Appl. No. 16/059,895, dated Apr. 24, 2020.

(56) References Cited

OTHER PUBLICATIONS

Non-Final Office Action issued in related U.S. Appl. No. 16/059,974, dated Apr. 24, 2020.
Non-Final Office Action issued in related U.S. Appl. No. 16/059,986, dated Apr. 24, 2020.
Final Office Action issued in related U.S. Appl. No. 16/100,310, dated May 8, 2020.
Final Office Action issued in related U.S. Appl. No. 16/058,912, dated May 26, 2020.
Non-Final Office Action issued in related U.S. Appl. No. 16/271,616, dated May 29, 2020.
Final Office Action issued in related U.S. Appl. No. 16/192,358, dated Jun. 2, 2020.
Non-Final Office Action issued in related U.S. Appl. No. 16/292,895, dated Jun. 5, 2020.
Final Office Action issued in related U.S. Appl. No. 16/058,941, dated Jun. 23, 2020.
Final Office Action issued in U.S. Appl. No. 16/058,936, dated Jun. 23, 2020.
Non-Final Office Action issued in related U.S. Appl. No. 16/058,856 dated Jul. 2, 2020.
Final Office Action issued in related U.S. Appl. No. 16/059,986, dated Jul. 6, 2020.
Non-Final Office Action issued in related U.S. Appl. No. 16/059,944 dated Sep. 28, 2018.
International Search Report and Written Opinion dated Oct. 2, 2018 in related International Application Serial No. PCT/US2018/045923.
International Search Report and Written Opinion dated Oct. 3, 2018 in related International Application Serial No. PCT/US2018/046024.
International Search Report and Written Opinion dated Oct. 3, 2018 in related International Application Serial No. PCT/US2018/045982.
International Search Report and Written Opinion dated Oct. 3, 2018 in related International Application Serial No. PCT/US2018/046008.
International Search Report and Written Opinion dated Oct. 2, 2018 in related International Application Serial No. PCT/US2018/046034.
International Search Report and Written Opinion dated Oct. 3, 2018 in related International Application Serial No. PCT/US2018/045926.
International Search Report and Written Opinion dated Sep. 21, 2018 in related International Application Serial No. PCT/US2018/046002.
Non-Final Office Action issued in related U.S. Appl. No. 16/059,818 dated Nov. 2, 2018.
International Search Report and Written Opinion dated Oct. 24, 2018 in related International Application Serial No. PCT/US2018/046041.
International Search Report and Written Opinion dated Oct. 16, 2018 in related International Application Serial No. PCT/US2018/046029.
International Search Report and Written Opinion dated Oct. 11, 2018 in related International Application Serial No. PCT/US2018/045994.
International Search Report and Written Opinion dated Oct. 22, 2018 in related International Application Serial No. PCT/US2018/045903.
International Search Report and Written Opinion dated Oct. 22, 2018 in related International Application Serial No. PCT/US2018/045917.
Klann, J. et el., "An Intelligent Listening Framework for Capturing Encounter Notes from a Doctor-Patient Dialog", BMC Med Inform Decis Mak. 2009; 9(Suppl 1): S3, Published online Nov. 3, 2009. doi: 10.1186/1472-6947-9-S1-S3, 5 pages.
Non-Final Office Action issued in related U.S. Appl. No. 16/058,871 dated Dec. 3, 2018.
International Search Report dated Oct. 30, 2018 in related International Application Serial No. PCT/US2018/045971.
International Search Report issued in PCT Application Serial No. PCT/US2018/046049 dated Nov. 2, 2018.
International Search Report issued in PCT Application Serial No. PCT/US2018/045921 dated Oct. 16, 2018.
International Search Report issued in PCT Application Serial No. PCT/US2018/045896 dated Oct. 17, 2018.
Non-Final Office Action issued in related U.S. Appl. No. 16/059,967 dated Jan. 2, 2019.
Non-Final Office Action issued in related U.S. Appl. No. 16/058,951 dated Oct. 5, 2018.
Kale, G. V. et al., "A Study of Vision based Human Motion Recognition and Analysis", International Journal of Ambient Computing and Intelligence, vol. 7, Issue 2, Jul.-Dec. 2016, 18 pages.
International Search Report issued in PCT Application Serial No. PCT/US2018/045908 dated Oct. 19, 2018.
International Search Report issued in PCT Application Serial No. PCT/US2018/045936 dated Oct. 18, 2018.
International Search Report issued in PCT Application Serial No. PCT/US2018/045987 dated Oct. 12, 2018.
International Search Report issued in PCT Application Serial No. PCT/US2018/046006 dated Oct. 15, 2018.
Invitation to Pay Additional Fees and, Where Applicable, Protest Fee issued in PCT Application Serial No. PCT/US2012/072041 dated Jun. 6, 2013.
International Search Report issued in related PCT Application Serial No. PCT/US2012/072041 dated Aug. 2, 2013.
Alapetite, A. et al., "Introducing vocal modality into electronics anaesthesia record systems: possible effects on work practices in the operating room", EACE '05 Proceedings of the 2005 Annual Conference on European Association of Cognitive Ergonomics, (2005), pp. 197-204.
Alapetite, A., "Speech recognition for the anaesthesia record during crisis scenarios", International Journal of Medical Informatics, 2008, vol. 77, No. 1, pp. 448-460.
Cimiano, P. et al., "Learning Concept Hierarchies from Text with a Guided Hierarchical Clustering algorithm", in C. Biemann and G. Paas (eds.), Proceedings of the ICML 2005 Workshop on Learning and Extending Lexical Ontologies with Machine Learning Methods, Bonn, Germany, 2005, 10 pages.
Fan, J. et al., "Prismatic: Inducing Knowledge from a Large Scale Lexicalized Relation Resource", Proceedings of the NAACL HLT 2010 First International Workshop on Formalisms and Methodology for Learning by Reading, Los Angeles, California, Jun. 2010, pp. 122-127.
Florian, R. et al., "A Statistical Model for Multilingual Entity Detection and Tracking", Proceedings of the Human Language Technologies Conference, (2004), 8 pages.
Gomez-Perez, A. et al., "An overview of methods and tools for ontology learning from texts", Knowledge Engineering Review, vol. 19, No. 3, (Sep. 2004), pp. 187-212.
Grasso, M. A., "Automated Speech Recognition in Medical Applications", M. D. Computing, vol. 12, No. (1995), 8 pages.
Harris, M. D., "Building a Large-scale Commercial NLG System for an EMR", Proceedings of the Fifth International Natural Language Generation Conference, (2008), pp. 157-160.
Jungk, A. et al., "A Case Study in Designing Speech Interaction with a Patient Monitor", Journal of Clinical Monitoring and Computing, vol. 16, (2000), pp. 295-307.
Klann, J. G. et al., "An intelligent listening framework for capturing encounter notes from a doctor-patient dialog", BMC Medical Informatics and Decision Making, vol. 9, (2009), published Nov. 3, 2009, 10 pages.
Meng, F. et al., Generating Models of Surgical Procedures using UMLS Concepts and Multiple Sequence Alignment, AMIA Annual Symposium Proceedings, (2005), pp. 520-524.
Szolovits, P. et al., "Fair Witness: Capturing Patient-Provider Encounter through Text, Speech, and Dialogue Processing", MIT Computer Science and Artificial Intelligence Laboratory (CSAIL) Clinical Decision Making Group. Last updated on Apr. 9, 2010, http://groups.csail.mit.edu/medg/projects/fw/, 3 pages.

(56) References Cited

OTHER PUBLICATIONS

Welty, C. et al., "Large Scale Relation Detection*", Proceedings of the NAACL HLT 2010 First International Workshop on Formalisms and Methodology for Learning by Reading, Association of Computational Linguistics, Los Angeles, CA, Jun. 2010, pp. 24-33.
Zafar, A. et al., "Continuous Speech Recognition for Clinicians", Technology Evaluation, Journal of the American Medical Informatics Association, vol. 6, No. 3, May/Jun. 1999, pp. 195-204.
Final Office Action issued in related U.S. Appl. No. 16/059,818 dated Feb. 28, 2019.
Non-Final Office Action issued in related U.S. Appl. No. 16/100,030 dated Feb. 28, 2019.
Non-Final Office Action issued in related U.S. Appl. No. 16/058,912 dated Mar. 6, 2019.
Final Office Action issued in related U.S. Appl. No. 16/058,951 dated Apr. 4, 2019.
Final Office Action issued in related U.S. Appl. No. 16/058,871 dated Apr. 8, 2019.
Non-Final Office Action issued in related U.S. Appl. No. 16/059,944 dated Apr. 15, 2019.
International Search Report issued in related PCT Application Serial No. PCT/US2019/020746 dated May 14, 2019.
Final Office Action issued in related U.S. Appl. No. 16/059,974, dated Jul. 6, 2020.
Final Office Action issued in related U.S. Appl. No. 16/059,895, dated Jul. 6, 2020.
Non-Final Office Action issued in related U.S. Appl. No. 16/059,944, dated Jul. 13, 2020.
Notice of Allowance issued in related U.S. Appl. No. 16/271,616 dated Jul. 13, 2020.
Non-Final Office Action issued in related U.S. Appl. No. 16/058,826, dated Jul. 17, 2020.
Non-Final Office Action issued in related U.S. Appl. No. 16/058,914, dated Jul. 17, 2020.
Non-Final Office Action issued in related U.S. Appl. No. 16/058,925 dated Jul. 20, 2020.
Non-Final Office Action issued in related U.S. Appl. No. 16/058,894 dated Jul. 30, 2020.
Non-Final Office Action issued in related U.S. Appl. No. 16/292,877 dated Jul. 23, 2020.
Non-Final Office Action issued in related U.S. Appl. No. 16/058,883 dated Jul. 31, 2020.
Non-Final Office Action issued in related U.S. Appl. No. 16/058,829 dated Aug. 5, 2020.
Final Office Action issued in related U.S. Appl. No. 16/058,856 dated Aug. 12, 2020.
Final Office Action issued in related U.S. Appl. No. 16/292,920 dated Aug. 11, 2020.
Non-Final Office Action issued in related U.S. Appl. No. 16/058,912 dated Aug. 20, 2020.
Non-Final Office Action issued in related U.S. Appl. No. 16/100,030 dated Aug. 25, 2020.
Non-Final Office Action issued in related U.S. Appl. No. 16/059,818 dated Aug. 25, 2020.
Non-Final Office Action issued in related U.S. Appl. No. 16/058,803 dated Sep. 3, 2020.
YouTube video clip entitled "Nuance PowerMic Mobile gives clinicians greater mobility", retrieved from Internet: https://www.youtube.com/watch?v=OjqiePRFtl@feature=emb-logo (Year: 2015), 3 pages.
Non-Final Office Action issued in related U.S. Appl. No. 16/271,029 dated Sep. 8, 2020.
Non-Final Office Action issued in related U.S. Appl. No. 16/293,032 dated Sep. 16, 2020.
Non-Final Office Action issued in related U.S. Appl. No. 16/192,427 dated Sep. 21, 2020.
Non-Final Office Action issued in related U.S. Appl. No. 16/271,329 dated Mar. 26, 2021.
Hu et al., "Deep Multimodel Speaker Naming", Computing Research Repository, vol. abs/1507.04831, 2015 (Year: 2015).
Final Office Action issued in related U.S. Appl. No. 16/271,029 dated Apr. 1, 2021.
Non-Final Office Action issued in related U.S. Appl. No. 16/058,826 dated Apr. 6, 2021.
Notice of Allowance issued in related U.S. Appl. No. 16/058,871 dated Apr. 9, 2021.
Final Office Action issued in related U.S. Appl. No. 17/084,310 dated Apr. 12, 2021.
Non-Final Office Action issued in related U.S. Appl. No. 16/441,740 dated Apr. 14, 2021.
Non-Final Office Action issued in related U.S. Appl. No. 16/442,247 dated Apr. 15, 2021.
Non-Final Office Action issued in related U.S. Appl. No. 16/058,925 dated Apr. 16, 2021.
Non-Final Office Action issued in related U.S. Appl. No. 16/058,914 dated Apr. 16, 2021.
Non-Final Office Action issued in related U.S. Appl. No. 16/058,894 dated Apr. 16, 2021.
Supplementary European Search Report issued in counterpart Application Serial No. 188344752.8 dated Mar. 3, 2021.
Non-Final Office Action issued in related U.S. Appl. No. 16/058,883 dated Apr. 28, 2021.
Notice of Allowance issued in related U.S. Appl. No. 16/059,944 dated Apr. 30, 2021.
Non-Final Office Action issued in related U.S. Appl. No. 16/292,893 dated Oct. 2, 2020.
David, G. C. et al., "Listening to what is said—transcribing what is heard: the impact of speech recognition technology, (SRT) on the practice of medical transcription (MT)", Sociology of Health and Illness, vol. 31, No. 6, pp. 924-938, (2009).
Non-Final Office Action issued in related U.S. Appl. No. 16/058,871 dated Oct. 5, 2020.
Non-Final Office Action issued in related U.S. Appl. No. 16/058,941 dated Oct. 26, 2020.
Non-Final Office Action issued in related U.S. Appl. No. 16/058,936 dated Oct. 26, 2020.
International Search Report and Written Opinion dated Aug. 19, 2020 in PCT Application Serial No. PCT/US2020/037284.
Final Office Action issued in related U.S. Appl. No. 16/058,826, dated Nov. 30, 2020.
Final Office Action issued in related U.S. Appl. No. 16/058,803 dated Nov. 30, 2020.
Final Office Action issued in related U.S. Appl. No. 16/058,883 dated Nov. 30, 2020
Final Office Action issued in related U.S. Appl. No. 16/058,925 dated Nov. 30, 2020.
Final Office Action issued in related U.S. Appl. No. 16/058,914, dated Nov. 30, 2020.
Final Office Action issued in related U.S. Appl. No. 16/292,895, dated Nov. 30, 2020.
Non-Final Office Action issued in related U.S. Appl. No. 16/192,358, dated Nov. 27, 2020.
Final Office Action issued in related U.S. Appl. No. 16/059,818 dated Dec. 4, 2020.
Non-Final Office Action issued in related U.S. Appl. No. 16/059,895, dated Dec. 9, 2020.
Final Office Action issued in related U.S. Appl. No. 17/084,310 dated Dec. 22, 2020.
Non-Final Office Action issued in related U.S. Appl. No. 16/059,974, dated Dec. 18, 2020.
Non-Final Office Action issued in related U.S. Appl. No. 16/059,986, dated Dec. 18, 2020.
International Search Report and Written Opinion dated Aug. 31, 2020 in PCT Application Serial No. PCT/US2020/037226.
Final Office Action issued in related U.S. Appl. No. 16/058,829 dated Jan. 11, 2021.
Non-Final Office Action issued in related U.S. Appl. No. 17/084,310, dated Dec. 21, 2020.
Notice of Allowance issued in related U.S. Appl. No. 16/100,030 dated Jan. 11, 2021.
Angles, R., "A Comparison of Current Graph Database Models", In: 2012 IEEE 28th International Conference on Data Engineering Workshops, Apr. 5, 2012 (Apr. 5, 2012) Retrieved on Aug. 5, 2020

(56) References Cited

OTHER PUBLICATIONS (Aug. 5, 2020) from URL:https://ieeexplore.ieee.org/document/6313676 entire document, 7 pages.
Final Office Action issued in related U.S. Appl. No. 16/059,944 dated Dec. 28, 2020.
Final Office Action issued in related U.S. Appl. No. 16/058,894 dated Dec. 1, 2020.
Final Office Action issued in related U.S. Appl. No. 16/058,941 dated Dec. 22, 2020.
Notice of Allowance issued in related U.S. Appl. No. 16/058,856 dated Jan. 19, 2021.
Non-Final Office Action issued in related U.S. Appl. No. 16/270,782 dated Jan. 19, 2021.
Notice of Allowance issued in related U.S. Appl. No. 16/058,912 dated Jan. 22, 2021.
Final Office Action issued in related U.S. Appl. No. 16/292,893 dated Jan. 28, 2021.
Notice of Allowance issued in related U.S. Appl. No. 16/100,030 dated Jan. 28, 2021.
Final Office Action issued in related U.S. Appl. No. 16/292,877 dated Feb. 8, 2021.
Non-Final Office Action issued in related U.S. Appl. No. 17/084,448 dated Feb. 10, 2021.
Non-Final Office Action issued in related U.S. Appl. No. 16/292,973 dated Feb. 12, 2021.
Final Office Action issued in related U.S. Appl. No. 16/192,427 dated Feb. 22, 2021.
International Search Report and Written Opinion dated Jan. 11, 2021 in PCT Application Serial No. PCT/US2020/053504.
International Search Report and Written Opinion dated Nov. 15, 2019 in PCT Application Serial No. PCT/US2019/047689.
Final Office Action issued in related U.S. Appl. No. 16/293,032 dated Mar. 1, 2021.
Non-Final Office Action issued in related U.S. Appl. No. 16/270,888 dated Mar. 2, 2021.
Notice of Allowance issued in related U.S. Appl. No. 16/058,856 dated Mar. 9, 2021.
Final Office Action issued in related U.S. Appl. No. 16/058,871, dated Mar. 18, 2021.
Non-Final Office Action issued in related U.S. Appl. No. 16/059,818 dated Mar. 18, 2021.
"Zhou et al., ""Applying the Narve Bayes Classifier to Assist Users in Detecting Speech Recognition Errors,"" Proceedings of the 38th Annual Hawaii International Conference on System Sciences, Big Island, HI, USA, 2005. pp. 118b-183b, doi: 10.1109/HICSS.2005. 99."
Abdulkader et al., "Low Cost Correction of OCR Errors Using Learning in a Multi-Engine Environment," 2009 10th International Conference on Document Analysis and Recognition, Barcelona, 2009, pp. 576-580, doi: 10.1109/ICDAR.2009.242.
Final Office Action issued in related U.S. Appl. No. 16/059,895 dated Mar. 24, 2021.
Final Office Action issued in related U.S. Appl. No. 16/059,974 dated Mar. 24, 2021.
Final Office Action issued in related U.S. Appl. No. 16/059,986 dated Mar. 24, 2021.
Non-Final Office Action issued in related U.S. Appl. No. 16/292,895 dated Mar. 25, 2021.
Non-Final Office Action issued in related U.S. Appl. No. 16/292,920 dated Mar. 26, 2021.
Non-Final Office Action issued in related U.S. Appl. No. 16/270,888 dated Mar. 26, 2021.

* cited by examiner

SYSTEM AND METHOD FOR ARRAY DATA SIMULATION AND CUSTOMIZED ACOUSTIC MODELING FOR AMBIENT ASR

BACKGROUND

Data augmentation may be used to achieve better WER on Ambient Automated Speech Recognition (ASR). Known uses of this technique typically solve the problem of, e.g., creating a more robust (to reverberation) and general Acoustic Model (AM). As such, a different technique may be needed for solving a different problem of creating a more targeted AM.

BRIEF SUMMARY OF DISCLOSURE

In one example implementation, a method, performed by one or more computing devices, may include but is not limited to measuring, by a computing device, a plurality of Room Impulse Responses (RIRs) associated with a set of two or more microphones. At least a portion of the RIRs may be augmented. At least the portion of the RIRs may be converted to their respective Relative Transfer Function (RTF) representations. The RTF representations may be applied to training data to generate an acoustic model for automatic speech recognition.

One or more of the following example features may be included. Augmenting at least the portion of the RIRs may include applying a weighting function to at least the portion of the RIRs. The weighting function may include an exponential decaying function of time. Converting at least the portion of the RIRs to their respective RTF representations may include simulating multi-channel data from a single channel. The multi-channel data may be simulated from the single channel data using a set of time delays. The multi-channel data may be simulated from the single channel data by applying at least one RTF to a speech utterance. The multi-channel data may be simulated from the single channel data by convolving the single channel data with one of measured RIRs and simulated RIRs.

In another example implementation, a computing system may include one or more processors and one or more memories configured to perform operations that may include but are not limited to measuring a plurality of Room Impulse Responses (RIRs) associated with a set of two or more microphones. At least a portion of the RIRs may be augmented. At least the portion of the RIRs may be converted to their respective Relative Transfer Function (RTF) representations. The RTF representations may be applied to training data to generate an acoustic model for automatic speech recognition.

One or more of the following example features may be included. Augmenting at least the portion of the RIRs may include applying a weighting function to at least the portion of the RIRs. The weighting function may include an exponential decaying function of time. Converting at least the portion of the RIRs to their respective RTF representations may include simulating multi-channel data from a single channel. The multi-channel data may be simulated from the single channel data using a set of time delays. The multi-channel data may be simulated from the single channel data by applying at least one RTF to a speech utterance. The multi-channel data may be simulated from the single channel data by convolving the single channel data with one of measured RIRs and simulated RIRs.

In another example implementation, a computer program product may reside on a computer readable storage medium having a plurality of instructions stored thereon which, when executed across one or more processors, may cause at least a portion of the one or more processors to perform operations that may include but are not limited to measuring a plurality of Room Impulse Responses (RIRs) associated with a set of two or more microphones. At least a portion of the RIRs may be augmented. At least the portion of the RIRs may be converted to their respective Relative Transfer Function (RTF) representations. The RTF representations may be applied to training data to generate an acoustic model for automatic speech recognition.

One or more of the following example features may be included. Augmenting at least the portion of the RIRs may include applying a weighting function to at least the portion of the RIRs. The weighting function may include an exponential decaying function of time. Converting at least the portion of the RIRs to their respective RTF representations may include simulating multi-channel data from a single channel. The multi-channel data may be simulated from the single channel data using a set of time delays. The multi-channel data may be simulated from the single channel data by applying at least one RTF to a speech utterance. The multi-channel data may be simulated from the single channel data by convolving the single channel data with one of measured RIRs and simulated RIRs.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
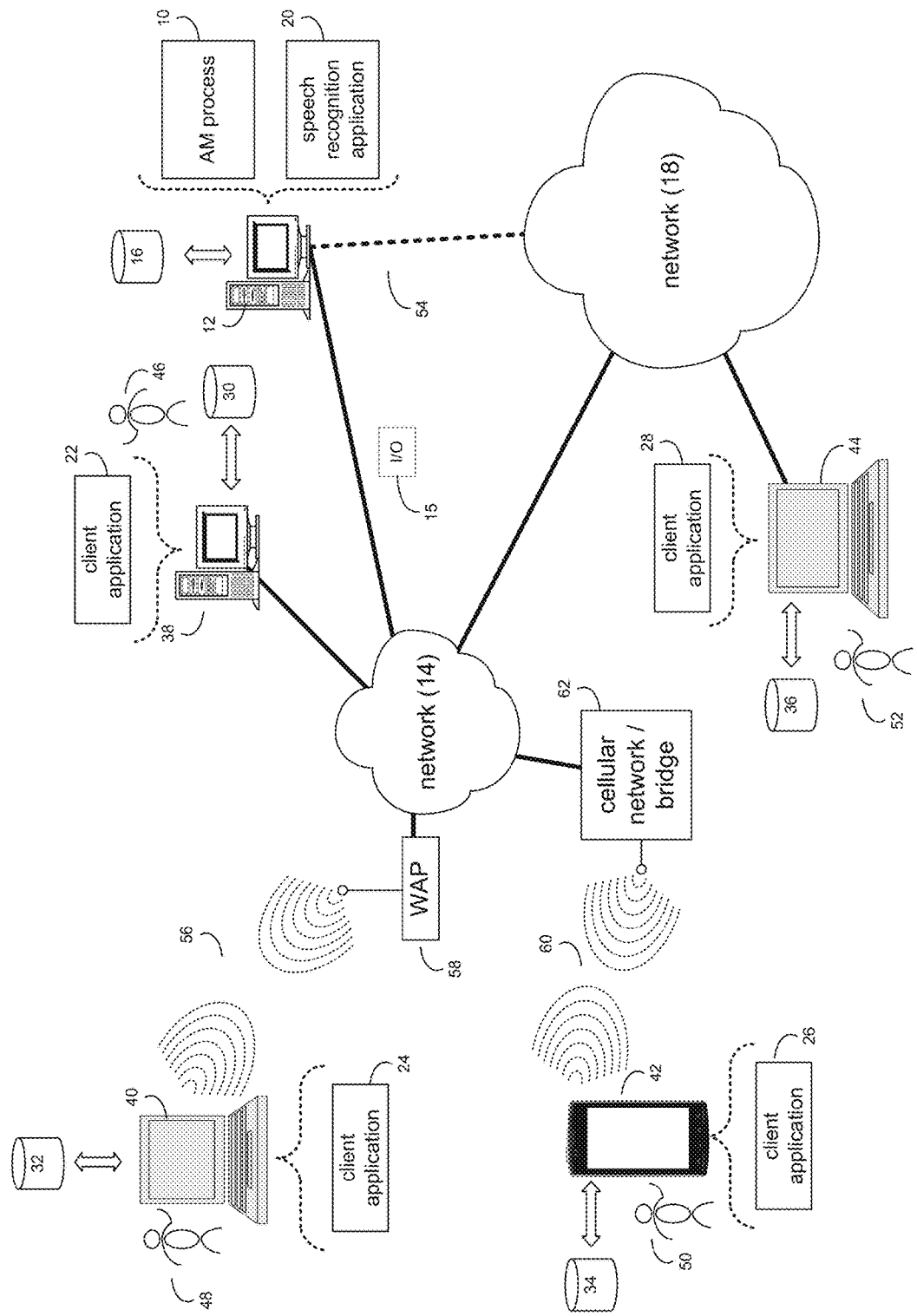
FIG. 1 is an example diagrammatic view of an AM process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown an Acoustic Modeling (AM) process 10 that may reside on and may be executed by a computer (e.g., computer 12), which may be connected to a network (e.g., network 14) (e.g., the interne or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a AM process, such as AM process 10 of FIG. 1, may measure, by a computing device, a plurality of Room Impulse Responses (RIRs) associated with a set of two or more microphones. At least a portion of the RIRs may be augmented. At least the portion of the RIRs may be converted to their respective Relative Transfer Function (RTF) representations. The RTF representations may be applied to training data to generate an acoustic model for automatic speech recognition.

In some implementations, the instruction sets and subroutines of AM process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, AM process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute an automatic speech recognition (ASR) application (e.g., speech recognition application 20), examples of which may include, but are not limited to, e.g., an automatic speech recognition (ASR) application (e.g., modeling, etc.), a natural language understanding (NLU) application (e.g., machine learning, intent discovery, etc.), a text to speech (TTS) application (e.g., context awareness, learning, etc.), a speech signal enhancement (SSE) application (e.g., multi-zone processing/beamforming, noise suppression, etc.), a voice biometrics/wake-up-word processing application, a video conferencing application, a voice-over-IP application, a video-over-IP application, an Instant Messaging (IM)/ "chat" application, a short messaging service (SMS)/multi-media messaging service (MMS) application, or other application that allows for virtual meeting and/or remote collaboration and/or recognition/translation of spoken language into text by computing devices.

In some implementations, AM process 10 and/or speech recognition application 20 may be accessed via one or more of client applications 22, 24, 26, 28. In some implementations, AM process 10 may be a standalone application, or may be an applet/application/script/extension that may interact with and/or be executed within speech recognition application 20, a component of speech recognition application 20, and/or one or more of client applications 22, 24, 26, 28. In some implementations, speech recognition application 20 may be a standalone application, or may be an applet/application/script/extension that may interact with and/or be executed within AM process 10, a component of AM process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of AM process 10 and/or speech recognition application 20. Examples of client applications 22, 24, 26, 28 may include, but are not limited to, e.g., an automatic speech recognition (ASR) application (e.g., modeling, etc.), a natural language understanding (NLU) application (e.g., machine learning, intent discovery, etc.), a text to speech (TTS) application (e.g., context awareness, learning, etc.), a speech signal enhancement (SSE) application (e.g., multi-zone processing/beamforming, noise suppression, etc.), a voice biometrics/wake-up-word processing application, a video conferencing application, a voice-over-IP application, a video-over-IP application, an Instant Messaging (IM)/

"chat" application, a short messaging service (SMS)/multimedia messaging service (MMS) application, or other application that allows for virtual meeting and/or remote collaboration and/or recognition/translation of spoken language into text by computing devices, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of AM process 10 (and vice versa). Accordingly, in some implementations, AM process 10 may be a purely server-side application, a purely client-side application, or a hybrid server-side/client-side application that is cooperatively executed by one or more of client applications 22, 24, 26, 28 and/or AM process 10.

In some implementations, one or more of client applications 22, 24, 26, 28 may be configured to effectuate some or all of the functionality of speech recognition application 20 (and vice versa). Accordingly, in some implementations, speech recognition application 20 may be a purely server-side application, a purely client-side application, or a hybrid server-side/client-side application that is cooperatively executed by one or more of client applications 22, 24, 26, 28 and/or speech recognition application 20. As one or more of client applications 22, 24, 26, 28, AM process 10, and speech recognition application 20, taken singly or in any combination, may effectuate some or all of the same functionality, any description of effectuating such functionality via one or more of client applications 22, 24, 26, 28, AM process 10, speech recognition application 20, or combination thereof, and any described interaction(s) between one or more of client applications 22, 24, 26, 28, AM process 10, speech recognition application 20, or combination thereof to effectuate such functionality, should be taken as an example only and not to limit the scope of the disclosure.

In some implementations, one or more of users 46, 48, 50, 52 may access computer 12 and AM process 10 (e.g., using one or more of client electronic devices 38, 40, 42, 44) directly through network 14 or through secondary network 18. Further, computer 12 may be connected to network 14 through secondary network 18, as illustrated with phantom link line 54. AM process 10 may include one or more user interfaces, such as browsers and textual or graphical user interfaces, through which users 46, 48, 50, 52 may access AM process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
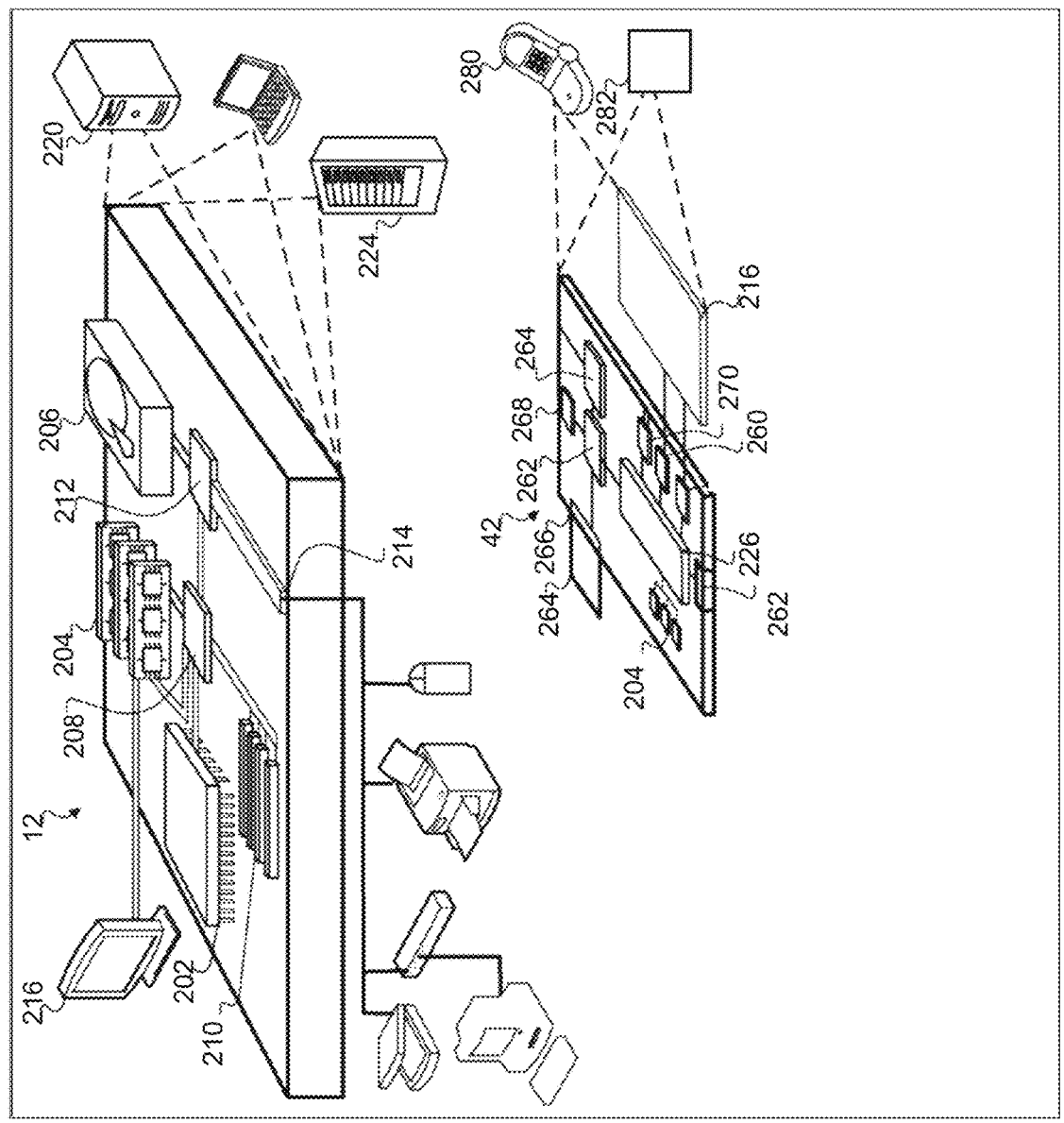
FIG. 2 is an example diagrammatic view of a computer and client electronic device of FIG. 1 according to one or more example implementations of the disclosure.

Referring also to the example implementation of FIG. 2, there is shown a diagrammatic view of computer 12 and client electronic device 42. While client electronic device 42 and computer 12 are shown in this figure, this is for example purposes only and is not intended to be a limitation of this disclosure, as other configurations are possible. Additionally, any computing device capable of executing, in whole or in part, AM process 10 may be substituted for client electronic device 42 and computer 12 (in whole or in part) within FIG. 2, examples of which may include but are not limited to one or more of client electronic devices 38, 40, and 44. Client electronic device 42 and/or computer 12 may also include other devices, such as televisions with one or more processors embedded therein or attached thereto as well as any of the microphones, microphone arrays, and/or speakers described herein. The components shown here, their connections and relationships, and their functions, are meant to be examples only, and are not meant to limit implementations of the disclosure described.

In some implementations, computer 12 may include processor 202, memory 204, storage device 206, a high-speed interface 208 connecting to memory 204 and high-speed expansion ports 210, and low speed interface 212 connecting to low speed bus 214 and storage device 206. Each of the components 202, 204, 206, 208, 210, and 212, may be interconnected using various busses, and may be mounted on a common motherboard or in other manners as appropriate. The processor 202 can process instructions for execution within the computer 12, including instructions stored in the memory 204 or on the storage device 206 to display graphical information for a GUI on an external input/output device, such as display 216 coupled to high speed interface 208. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

Memory 204 may store information within the computer 12. In one implementation, memory 204 may be a volatile memory unit or units. In another implementation, memory 204 may be a non-volatile memory unit or units. The memory 204 may also be another form of computer-readable medium, such as a magnetic or optical disk.

Storage device 206 may be capable of providing mass storage for computer 12. In one implementation, the storage device 206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 204, the storage device 206, memory on processor 202, or a propagated signal.

High speed controller 208 may manage bandwidth-intensive operations for computer 12, while the low speed controller 212 may manage lower bandwidth-intensive operations. Such allocation of functions is exemplary only. In one implementation, the high-speed controller 208 may be coupled to memory 204, display 216 (e.g., through a graphics processor or accelerator), and to high-speed expansion ports 210, which may accept various expansion cards (not shown). In the implementation, low-speed controller 212 is coupled to storage device 206 and low-speed expansion port 214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computer 12 may be implemented in a number of different forms, as shown in the figure. For example, computer 12 may be implemented as a standard server 220, or multiple times in a group of such servers. It may also be implemented as part of a rack server system 224. Alternatively, components from computer 12 may be combined with other components in a mobile device (not shown), such as client electronic device 42. Each of such devices may contain one or more of computer 12, client electronic device 42, and an entire system may be made up of multiple computing devices communicating with each other.

Client electronic device 42 may include processor 226, memory 204, an input/output device such as display 216, a communication interface 262, and a transceiver 264, among other components. Client electronic device 42 may also be provided with a storage device, such as a microdrive or other device, to provide additional storage. Each of the components 226, 204, 216, 262, and 264, may be interconnected using various buses, and several of the components may be mounted on a common motherboard or in other manners as appropriate.

Processor 226 may execute instructions within client electronic device 42, including instructions stored in the memory 204. The processor may be implemented as a chipset of chips that include separate and multiple analog and digital processors. The processor may provide, for example, for coordination of the other components of client electronic device 42, such as control of user interfaces, applications run by client electronic device 42, and wireless communication by client electronic device 42.

In some embodiments, processor 226 may communicate with a user through control interface 258 and display interface 260 coupled to a display 216. The display 216 may be, for example, a TFT LCD (Thin-Film-Transistor Liquid Crystal Display) or an OLED (Organic Light Emitting Diode) display, or other appropriate display technology. The display interface 260 may comprise appropriate circuitry for driving the display 216 to present graphical and other information to a user. The control interface 258 may receive commands from a user and convert them for submission to the processor 226. In addition, an external interface 262 may be provide in communication with processor 226, so as to enable near area communication of client electronic device 42 with other devices. External interface 262 may provide, for example, for wired communication in some implementations, or for wireless communication in other implementations, and multiple interfaces may also be used.

In some embodiments, memory 204 may store information within the Client electronic device 42. The memory 204 can be implemented as one or more of a computer-readable medium or media, a volatile memory unit or units, or a non-volatile memory unit or units. Expansion memory 264 may also be provided and connected to client electronic device 42 through expansion interface 266, which may include, for example, a SIMM (Single In Line Memory Module) card interface. Such expansion memory 264 may provide extra storage space for client electronic device 42, or may also store applications or other information for client electronic device 42. Specifically, expansion memory 264 may include instructions to carry out or supplement the processes described above, and may include secure information also. Thus, for example, expansion memory 264 may be provide as a security module for client electronic device 42, and may be programmed with instructions that permit secure use of client electronic device 42. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 204, expansion memory 264, memory on processor 226, or a propagated signal that may be received, for example, over transceiver 264 or external interface 262.

Client electronic device 42 may communicate wirelessly through communication interface 262, which may include digital signal processing circuitry where necessary. Communication interface 262 may provide for communications under various modes or protocols, such as GSM voice calls, SMS, EMS, or MMS speech recognition, CDMA, TDMA, PDC, WCDMA, CDMA2000, or GPRS, among others. Such communication may occur, for example, through radio-frequency transceiver 264. In addition, short-range communication may occur, such as using a Bluetooth, WiFi, or other such transceiver (not shown). In addition, GPS (Global Positioning System) receiver module 268 may provide additional navigation and location-related wireless data to client electronic device 42, which may be used as appropriate by applications running on client electronic device 42.

Client electronic device 42 may also communicate audibly using audio codec 270, which may receive spoken information from a user and convert it to usable digital information. Audio codec 270 may likewise generate audible sound for a user, such as through a speaker, e.g., in a handset of client electronic device 42. Such sound may include sound from voice telephone calls, may include recorded sound (e.g., voice messages, music files, etc.) and may also include sound generated by applications operating on client electronic device 42. Client electronic device 42 may be implemented in a number of different forms, as shown in the figure. For example, it may be implemented as a cellular telephone 280. It may also be implemented as part of a smartphone 282, personal digital assistant, remote control, or other similar mobile device.

Data augmentation may be used to achieve better WER on Ambient Automated Speech Recognition (ASR). Known uses of this technique typically solve the problem of, e.g., creating a more robust (to reverberation) and general Acoustic Model (AM) by using Room Impulse Response (RIR) convolution to create a single, more generalized AM. Such techniques typically use image method based MR simulations to achieve the diversity in RIRs needed to do the ambient data augmentation. Those techniques may also typically use clean (i.e., anechoic) speech material (or sample based on signal characteristics such as SNR). The assumption being that the base material is not "ambient" and thus the data augmentation should introduce the far-field (reverberation) characteristics. These RIRs are subject to large variations with small changes in microphone-speaker positions (even within the same room). However, as will be described in further detail, when attempting to achieve a more targeted AM, the present disclosure may use Relative Transfer Functions (RTFs) (which are temporally much shorter than RIRs and therefore a more compact representation) combined with an artificial weighting of the small set of measured RIRs to create a larger (but more matched) set of RIRs (e.g., from a room) from which RTFs may be derived.

As will be discussed in greater detail below, the present disclosure may solve one or more example problems when building Acoustic Models (AMs), e.g., for Ambient ASR:

I. Lack of multi-channel data from microphone arrays. When performing Ambient ASR, the use of spatial filtering via beamforming may be beneficial in reducing the noise and reverberation of the signal. However, this type of data may require a large effort in data collection with the appropriate device. Also, over time, the array device may be evolved and may include a different geometry and microphone configuration. There is, however, a large repository of single channel audio data (e.g., available from body worn microphones or from mobile handsets or from near field microphones like a laptop microphone). As the system may be interested in modeling the relative changes in the acoustic channel(s) between different microphones of an array, the present disclosure may enable (e.g., without clean (anechoic) speech material or speech selected from a set of recordings by analyzing signal characteristics such as SNR, meaning that either the system starts with clean anechoic speech or the system selects the cleanest sample from whatever data is available): a. mapping of single channel data into multi-channel data and b. mapping a single channel from an array to a different array geometry and configuration. The present disclosure may only require a single channel recording, which may already come from a signal distant microphone (and thus may already contain reverberation effects, which may also make the data collection more natural and in-domain). The present disclosure may attempt to model the relative differences that allow mapping this single channel signal into a multi-channel signal; however, it will be appreciated that the present disclosure may also use clean data (e.g., data without noise and without reverberation) when available.

II. Highly targeted AM without collected speech material. Acoustic models may be adapted for specific speakers and channels and this may give some gains in ASR performance over general systems. However, there are scenarios where the "room" or acoustic area and acoustic device are known a priori (for example a doctor-patient conversation in a particular room with a known microphone array). This allows a further adaptation or full-retraining of the acoustic model by considering specific room acoustics (e.g., room reverberation and room ambient noise) and device characteristics (e.g., particular microphone frequency responses) and location (e.g., placed on a certain wall with other furnishings around). This gives the targeted AM an additional advantage resulting in better performance. Thus, the present disclosure may additionally/alternatively enable a. better adaptation to a fixed setup (e.g., room and device) resulting in lower WER, and b. the possibility to adapt data without explicit collection of speech material from the room itself (all that may be required is a small number of room impulse response measurements which may be done at install time and/or periodically). This means that training and adaptation data may be used that is not subject to data privacy and retention policies giving a big competitive edge.

In some examples, there may be a lot of single channel data and almost nothing from microphone arrays, making deployment in the field suboptimal when a microphone array device is available (since the system may not be able to match post beamforming data). The disclosed data simulation technology may provide the opportunity to rapidly deploy ASR in the Ambient use case with a microphone array device and also gives the ability to redeploy the models when a new device is produced (typically, when a new array device is developed, the front end algorithms like beamforming will have a mismatch in performance and once a considerable amount of data is collected from the new device will the ASR performance stabilize again—with the present disclosure, the system may more quickly bootstrap an AM and deploy it). While some systems may use simulated room impulse response-based processing to make an acoustic model more robust to reverberation, such systems are not known to exploit impulse response based Relative Transfer Function (RTF) method for simulating multi-channel data from a single channel.

Additionally/alternatively, in some implementations, while other systems may target RIR convolution to achieve a more general Ambient AM (e.g., requiring a large sampling (spatially) of the target room), the present disclosure may create a room specific customization of a highly targeted acoustic models using a small set of measured RIRs from a particular room with a particular device. The system may use an exponential decaying function of time to augment the small set of RIRs to create a larger number of RIRs and use them for data augmentation of the base speech material. This type of data augmentation may allow for highly adapted AM from a particular room and device allowing better performing ambient ASR. Moreover, since the requirement is a small collection of RIRs, the system may be deployed in areas where strict data retention and privacy regulations may prevent collecting field material (e.g., speech) to train the ASR. Additionally, this approach may allow use of speech material with a less restrictive data retention and privacy restriction and still take advantage of matched room acoustics (e.g., even in cases where there is the collection of restricted speech material it may be beneficial to use the disclosed data augmentation approach because there may be no need to continuously transcribe training data). This may enable the use of less restrictive data to create an acoustically matched AM without needing to collect speech from the actual room (only potentially requiring the collection of a small number of RIRs). The present disclosure may also avoid data retention related issues (e.g., where a system may only be able to retain data from the room for a short duration—say 2 years). In this scenario, the present disclosure does not need to continuously collect, transcribe and train AMs for that room, as the present disclosure may allow the collection of some RIR data and then train a model just once. Moreover, from the measured RIRs, the present disclosure may compute the T60 (defined as the time it takes for the energy in RIR to decay by 60 dB) and C50 (e.g., measure of the ratio of the early sound energy (e.g., between 0 and 50 ms) and the late sound energy (e.g., arriving later than 50 ms)) measures and use these as guides to augment the data with some simulated RIRs as well.

The present disclosure may enable rapid deployment to new locations and save a lot of time and expense spent currently on transcribing data (since there would only be a need to do the transcription once for data with a very long retention policy and fewer privacy issues).

As will be discussed below, an example and non-limiting difference to the present disclosure is the use of the more robust, measured RIR based RTF representation of the room-array acoustic system. The unique approach of augmentation of the measured RIRs gives the ability to work with a small sample of RIRs from a room/device. This data augmentation technology gives the ability to more rapidly deploy a product and may also provide big cost saving benefits (e.g., due to the reduction in transcription and speech data collection from the field).

Figure 3:
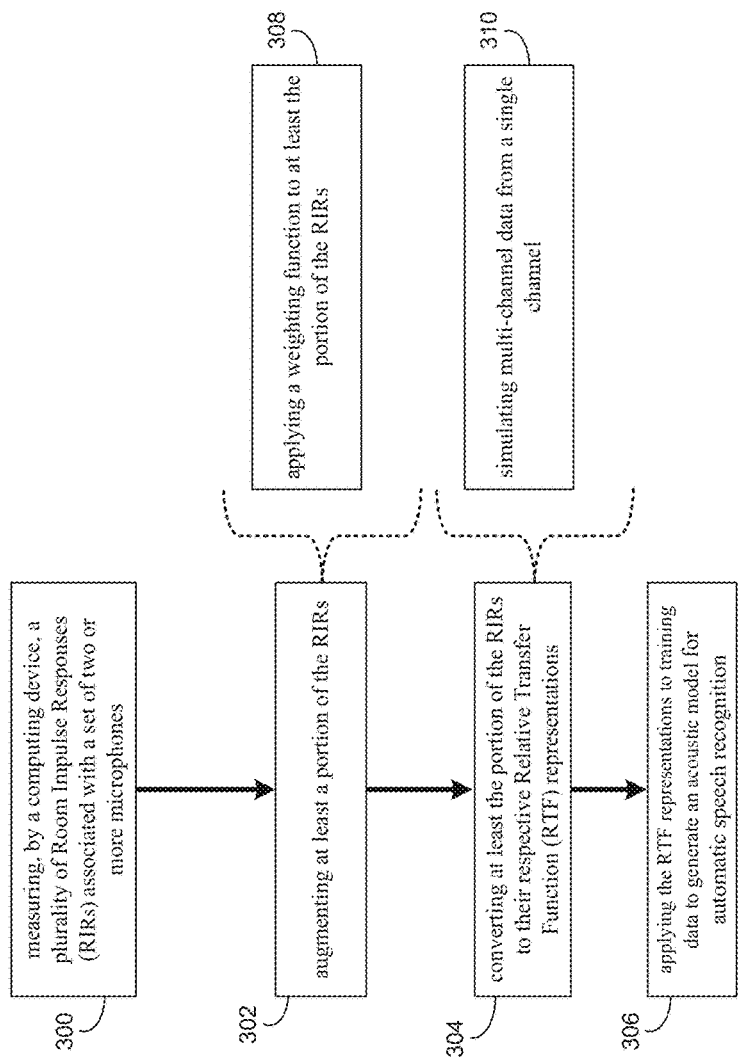
FIG. 3 is an example flowchart of a AM process according to one or more example implementations of the disclosure.

The AM Process:

As discussed above and referring also at least to the example implementations of FIG. 3, AM process 10 may measure 300, by a computing device, a plurality of Room Impulse Responses (RIRs) associated with a set of two or more microphones. AM process 10 may augment 302 at least a portion of the RIRs. AM process 10 may convert 304 at least the portion of the RIRs to their respective Relative Transfer Function (RTF) representations. AM process 10 may apply 306 the RTF representations to training data to generate an acoustic model for automatic speech recognition.

In some implementations, AM process 10 may measure 300, by a computing device, a plurality of Room Impulse Responses (RIRs) associated with a set of two or more microphones (e.g., such as a microphone array). For example, AM process 10 may collect and measure, e.g., 300 RIRs from a target room-device setup. For instance, say for example purposes only that there are 20 RIRs comprising a few typical locations (e.g., doctor standing close to a patient in bed, etc.) and a few extreme situations (e.g., a patient in a chair and a doctor near the entrance to the room, etc). Each MR may be, e.g., 16 channel (or as many channels as the array has). AM process 10 may also record a few minutes of ambient noise with the array device in the room. In some implementations, the RIRs may be captured by AM process 10 by playing back swept since signals, and AM process 10 may also playback and record some tone burst signals (e.g. 1 kHz and 2 kHz) and some white noise bursts. In some implementations, AM process 10 may obtain RIR signals and extract, e.g., C50 and T60 from these.

In some implementations, AM process 10 may augment 302 at least a portion of the RIRs. For instance, augmenting 302 at least the portion of the RIRs may include applying 308 a weighting function to at least the portion of the RIRs. In some implementations, a range of different weighting functions may be applied in sequence in order to increase the overall diversity of RIRs and RTFs. The weighting function may include an exponential decaying function of time. For instance, AM process 10 may apply 308 an exponential weighting based augmentation (e.g., with different parameters and starting points along the RIR signal) to alter, e.g., the T60 and C50 balance of the RIRs (this does not necessarily alter the reflection positions within the RIR, and may only reduce some of their amplitudes—simulating some changes in sound absorption in the room such as the source moving closer to the array, etc.). A number of these augmentations may be applied. Assume for example purposes only that AM process 10 applies five such factors to the RIRs, then AM process 10 may end up with 100 RIRs to use. Optionally, AM process 10 may measure the T60 and C50 of the measured RIRs and use that as a guide to "simulate" additional RIRs within a narrow window of, e.g., T60 and C50s and add to the RIR set.

In some implementations, AM process 10 may convert 304 at least the portion of the RIRs to their respective Relative Transfer Function (RTF) representations. In some implementations, AM process 10 may convert the joint set of augmented and measured RIRs (and possibly also add some simulated RIRs using the measured T60 and C50 as a guide) to their RTF representations. For instance, AM process 10 may convert 304 the measured and/or simulated RIRs to their RTF representation using, for example, a 1024 point FFT average.

In some implementations, AM process 10 may apply 306 the RTF representations to training data to generate an acoustic model for automatic speech recognition. For example, AM process 10 may apply 306 a randomly selected RTF to a speech utterance (which may be from a near field collection or from a previous array channel 1, etc.). This is discussed in more detail below with regard to the simulation 310 of the multi-channel data from the single channel data by applying at least one RTF to a speech utterance. AM process 10 may then obtain the new "targeted" data, run signal processing front-end (e.g., beamforming, etc.) and then train the AM, resulting in a more targeted AM for the specific device in the specific room.

In some implementations, converting 304 at least the portion of the RIRs to their respective RTF representations may include simulating 310 multi-channel data from a single channel. For instance, in some implementations, the simulations described here may require a convolution with a filter in time (or may be accomplished in the frequency domain), resulting in a small delay being introduced (e.g., in the case of RIR, and this comes primarily from the bulk delay before the direct path representing the propagation delay between the source and the microphone). An attempt may be made to compensate for some of that delay to allow the AM training process of AM process 10 to re-use the state level alignments from the original single channel data. Discussed below are three example and non-limiting approaches for simulating array data from a single channel signal.

First, in some implementations, the multi-channel data may be simulated 310 from the single channel data using a set of time delays. This example approach may add a constant delay to the single channel signals to simulate the propagation delay to each microphone in an array (e.g., these delays may be computed by assuming an anechoic room and placing a source and a microphone array in an arbitrary position). This may be accomplished by convolution with a linear filter with a delta placed at the required sample delay value and zeros everywhere else. This method may not necessarily be ideal, as it does not necessarily model the reverberation characteristics of the room.

Second, in some implementations, the multi-channel data may be simulated 310 from the single channel data by applying at least one RTF to a speech utterance. For example, the RTF may be generally defined as the ratio of two RIRs. To extract the RTFs, AM process 10 may use the above-noted measured (and/or simulated) RIRs from a position in a room to each microphone of the array that is being simulated. For instance, in some implementations, assume that RIRs may be measured using the swept sine method from [1]. The particular RIRs may be captured using, e.g., a loudspeaker placed at a distance of, e.g., 1 meter from the array device with at least two microphones (e.g., 16 channels) placed on the wall or elsewhere. It will be appreciated that any configuration with at least two microphones (i.e., N microphone channels where N≥2) may be used without departing from the scope of the disclosure. AM process 10 may resample and normalize the RIRs (in terms of energy) and shorten to a set length (in the example, the length may be set to 500 ms). AM process 10 may apply, e.g., a 40 ms cross fade (e.g., using a hanning window) before trimming to ensure no deleterious edge effects. In the example, the RTF may be computed for each microphone, assigning channel 1 as the reference, as follows:

$$RTF(\omega)_i = \frac{RIR_i(\omega)}{RIR_1(\omega)}, \text{ for } i = 2, \ldots, 16$$

where $RIR_1(\omega)$ denotes the complex frequency spectrum of the RIR measured at channel 1 of the array and $RTF(\omega)_i$ is obtained by the complex division of the two spectra. The RTF computed in this manner are complex valued frequency spectral representations that capture the relative differences between the channel RIR measured at channel 1 and channel i. Since the RIR spectrum is much larger than a typical speech frame (e.g., 500 ms for the RIR and typically 30-40 ms for a speech frame), AM process 10 may estimate the complex RIR spectrum by applying a sliding window and averaging the frequency spectrum of the RIR.

To apply the RTF to a speech utterance, the following example process may be followed:

A. Resample the speech signal to the RTF sample rate

B. Apply a window (e.g., any raised Cosine type window) to the speech signal and segment into, e.g., 30 ms frames with a, e.g., 10 ms frame increment (in practice any window length may be used where it may be assumed the speech signal is stationary—typically between 10 and 40 ms).

C. Compute the FFT of each frame.

D. How to select an RTF set (e.g., measured in a particular room).

E. Multiply point wise, the RTF with the FFT for each frame (the complex multiplication in frequency is equivalent to convolution in time).

F. Overlap add and repeat for each channel of the array.

In the example simulation setup, the reference signal is taken as the channel 1 signal (the RTF for channel 1 is unity) and then the RTF for each remaining channel is applied to the signal, resulting in a 16 channel (or any N channel signal where N≥2) file (or other storage object) for every recording. In this example manner, AM process 10 is simulating a body worn array placed on a doctor or other person (since we use the signal as channel 1). For a given signal, s, AM process 10 may segment the signal into segments of length, e.g., 30 ms and apply a hamming window, shifting by, e.g., 10 ms. The RTFs may be stored as complex frequency representations for each subsequent channel (e.g., channel 2 to 16+) using a, e.g., 1024 point Fast Fourier Transform (FFT) and the array simulated signal for channel i may be computed as follows:

$$\alpha(n)_i = \text{IFFT}(\text{RTF}_i \times S(\omega)), \text{ for } i=1, \ldots, 16$$

$$S(\omega) = \text{FFT}(s(n) \times W)(n))$$

where W(n) is a is a Hamming window and s(n) is the signal in the current window.

In the above, IFFT refers to the inverse FFT of the complex multiplication of short time FFT of the speech signal with the RTF for channel I. An example and non-limiting advantage of using RTF based processing is that it may be more invariant than an RIR (which may vary with small movements of the source) allowing AM process 10 to better capture the important aspects of the room and device acoustic system.

Third, in some implementations, the multi-channel data may be simulated 310 from the single channel data by convolving the single channel data with one of measured RIRs and simulated RIRs. As in the RTF method, it may be possible to use directly the measured RIRs from a multi-microphone device to perform the data augmentation (e.g., by convolving the single channel data with measured RIRs). This may be done for a target room or by pooling RIRs measured in a variety of rooms, thereby enabling data augmentation. In the example, the convolution may be referred to with a measured RIR in a target room as the MRIR method. AM process 10 may use RIRs measured in, e.g., 1 room, 1.5 m distance, 13 azimuths), although other variations may be used.

It may also be possible for AM process 10 to simulate multi-channel RIRs and convolve those with the single channel data to create simulated multi-channel data. This may be generally referred to as the SRIR method. AM process 10 may use simulated multi-channel RIRs (e.g., 263) using the Images method (which is an algorithm for simulating room impulse responses) as noted in J. B. Allen and D. A. Berkley, "Image method for efficiently simulating small-room acoustics," Journal Acoustic Society of America, 65(4), April 1979, p 943. In the example setup, 4 rooms were simulated, resulting in 16 channel (or any N channel signal where N≥2) RIRs representing a T60 range of 200 to 415 ms, 33 azimuth angles at a range of 0.75 and 1.0 m. It will be appreciated that various other setups may be used without departing from the scope of the disclosure.

As noted above, acoustic models may be adapted for specific speakers and channels and this gives some gains in ASR performance over general systems. However, there are scenarios where the "room" or acoustic area and acoustic device are known a priori (for example a doctor-patient conversation in a particular room with a known microphone array). This may allow a further adaptation or full-retraining of the acoustic model by considering the following:

A. Room acoustics—AM process 10 may capture a model of the room reverberation and room ambient noise by making some RIR measurements in the target room (either at install time using an external loudspeaker or even periodically). The RIRs may be converted to their RTF representations for a more robust representation.

B. Device characteristics—measuring the RIRs may also allow the capturing of the particular microphone frequency responses.

C. Location characteristics—the RIR measurements may also allow the capturing of particular effects of placing the device(s) in a particular location in the room.

Without this, the AM may have to be trained of a larger amount of augmented data to ensure its robust to many combinations of the above. Thus, AM process 10 may allow the need to sample a few points in the room for the RIR and may derive a larger set of RIRs by applying different weighting functions to the RIRs and thus modifying their properties. Moreover, an example and non-limiting advantage here is that the system does not need speech data from the target room. In certain situations, like healthcare, this may be particularly advantageous as it allows highly adapted AMs where it may not be possible to collect speech data from the target room (due to privacy concerns and regulations). Moreover, even when such a collection is possible, it may come with a high cost due to data retention and privacy policies (which may mean a continuous cost of transcribing the field data on an ongoing basis). The present disclosure may do away with this requirement and allow the training of the AM with less restrictive data.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   measuring, by a computing device, a plurality of Room Impulse Responses (RIRs) associated with a set of two or more microphones;
   augmenting at least a portion of the RIRs;
   converting at least the portion of the RIRs to their respective Relative Transfer Function (RTF) representations of at least the portion of the RIRs, wherein converting at least the portion of the RIRs to their respective RTF representations includes simulating multi-channel data from a single channel; and
   applying the respective RTF representations to training data to generate an acoustic model for automatic speech recognition.

2. The computer-implemented method of claim 1 wherein augmenting at least the portion of the RIRs includes applying a weighting function to at least the portion of the RIRs.

3. The computer-implemented method of claim 2 wherein the weighting function includes an exponential decaying function of time.

4. The computer-implemented method of claim 1 wherein the multi-channel data is simulated from the single channel data using a set of time delays.

5. The computer-implemented method of claim 1 wherein the multi-channel data is simulated from the single channel data by applying at least one RTF to a speech utterance.

6. The computer-implemented method of claim 1 wherein the multi-channel data is simulated from the single channel data by convolving the single channel data with one of measured RIRs and simulated RIRs.

7. A computer program product residing on a non-transitory computer readable storage medium having a plurality of instructions stored thereon which, when executed across one or more processors, causes at least a portion of the one or more processors to perform operations comprising:
   measuring a plurality of Room Impulse Responses (RIRs);
   augmenting at least a portion of the RIRs;
   converting at least the portion of the RIRs to their respective Relative Transfer Function (RTF) representations of at least the portion of the RIRs, wherein converting at least the portion of the RIRs to their respective RTF representations includes simulating multi-channel data from a single channel; and
   applying the respective RTF representations to training data to generate an acoustic model for automatic speech recognition.

8. The computer program product of claim 7 wherein augmenting at least the portion of the RIRs includes applying a weighting function to at least the portion of the RIRs.

9. The computer program product of claim 8 wherein the weighting function includes an exponential decaying function of time.

10. The computer program product of claim 7 wherein the multi-channel data is simulated from the single channel data using a set of time delays.

11. The computer program product of claim 7 wherein the multi-channel data is simulated from the single channel data by applying at least one RTF to a speech utterance.

12. The computer program product of claim 7 wherein the multi-channel data is simulated from the single channel data by convolving the single channel data with one of measured RIRs and simulated RIRs.

13. A computing system including one or more processors and one or more memories configured to perform operations comprising:
  measuring, by a computing device, a plurality of Room Impulse Responses (RIRs);
  augmenting at least a portion of the RIRs;
  converting at least the portion of the RIRs to their respective Relative Transfer Function (RTF) representations of at least the portion of the RIRs, wherein converting at least the portion of the RIRs to their respective RTF representations includes simulating multi-channel data from a single channel; and
  applying the respective RTF representations to training data to generate an acoustic model for automatic speech recognition.

14. The computing system of claim 13 wherein augmenting at least the portion of the RIRs includes applying a weighting function to at least the portion of the RIRs.

15. The computing system of claim 14 wherein the weighting function includes an exponential decaying function of time.

16. The computing system of claim 13 wherein the multi-channel data is simulated from the single channel data using a set of time delays.

17. The computing system of claim 13 wherein the multi-channel data is simulated from the single channel data by at least one of applying at least one RTF to a speech utterance, and convolving the single channel data with one of measured RIRs and simulated RIRs.

* * * * *